US008850250B2

(12) United States Patent
Looi et al.

(10) Patent No.: US 8,850,250 B2
(45) Date of Patent: *Sep. 30, 2014

(54) INTEGRATION OF PROCESSOR AND INPUT/OUTPUT HUB (75) Inventors: Lily Pao Looi, Portland, OR (US); Stephan J. Jourdan, Portland, OR (US); Selim Bilgin, Hillsboro, OR (US); Sin S. Tan, Portland, OR (US); Anant S. Deval, Beaverton, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/791,836

(22) Filed: Jun. 1, 2010

(65) Prior Publication Data

US 2011/0296216 A1    Dec. 1, 2011

(51) Int. Cl.
*G06F 1/32*    (2006.01)

(52) U.S. Cl.
CPC .......... *G06F 1/3243* (2013.01); *G06F 1/3287* (2013.01); *G06F 1/324* (2013.01); *G06F 1/3206* (2013.01)
USPC ........... 713/323; 713/300; 713/310; 713/320; 713/321; 713/322; 713/324; 713/330; 713/340; 710/309; 710/310; 710/313; 710/316

(58) Field of Classification Search
USPC ................ 713/300, 310, 320–324, 330, 340; 710/309–310, 313, 316
See application file for complete search history.

(56) References Cited

U.S. PATENT DOCUMENTS

| 5,404,544 | A | 4/1995 | Crayford |
| 5,761,516 | A | 6/1998 | Rostoker et al. |
| 5,893,153 | A | 4/1999 | Tzeng et al. |
| 6,009,488 | A | 12/1999 | Kavipurapu |
| 6,442,697 | B1 | 8/2002 | Jain et al. |
| 6,487,689 | B1 | 11/2002 | Chuah |
| 6,536,024 | B1 | 3/2003 | Hathaway |
| 6,721,840 | B1 | 4/2004 | Allegrucci |
| 6,980,024 | B1 | 12/2005 | May et al. |
| 7,181,188 | B2 | 2/2007 | Vu et al. |
| 7,353,374 | B1 | 4/2008 | Trimberger |
| 7,702,639 | B2 * | 4/2010 | Stanley et al. ............. 707/999.1 |

(Continued)

FOREIGN PATENT DOCUMENTS

| CN | 102270187 A | 12/2011 |
| JP | 2006-285872 A | 10/2006 |

(Continued)

OTHER PUBLICATIONS

International Search Report and Written Opinion Received for PCT Application No. PCT/US2011/037990, mailed on Feb. 9, 2012, 10 pages.

(Continued)

*Primary Examiner* — M Elamin
(74) *Attorney, Agent, or Firm* — Caven & Aghevli LLC (57) ABSTRACT Methods and apparatus for integration of a processor and an input/output hub are described. In one embodiment, a sideband signal may cause change in a power management state of a processor or an integrated I/O logic. A single integrated circuit die may include both the processor and the integrated I/O logic. Other embodiments are also disclosed.

20 Claims, 5 Drawing Sheets

(56) References Cited

U.S. PATENT DOCUMENTS

| | | | |
|---|---|---|---|
| 7,814,371 B2* | 10/2010 | Sams et al. | 714/43 |
| 7,865,744 B2 | 1/2011 | Lee et al. | |
| 7,882,294 B2* | 2/2011 | Love | 710/305 |
| 7,898,994 B2 | 3/2011 | Zhao et al. | |
| 8,181,059 B2* | 5/2012 | Millet et al. | 713/601 |
| 8,304,698 B1 | 11/2012 | Tischler | |
| 2002/0033828 A1 | 3/2002 | Deering et al. | |
| 2003/0159024 A1 | 8/2003 | Chen | |
| 2003/0226050 A1 | 12/2003 | Yik et al. | |
| 2004/0139283 A1 | 7/2004 | Arimilli et al. | |
| 2004/0215371 A1 | 10/2004 | Samson et al. | |
| 2005/0128846 A1 | 6/2005 | Momtaz et al. | |
| 2005/0149768 A1 | 7/2005 | Kwa et al. | |
| 2005/0283561 A1 | 12/2005 | Lee et al. | |
| 2006/0174142 A1 | 8/2006 | Lin et al. | |
| 2006/0224806 A1 | 10/2006 | Suzuki | |
| 2007/0005995 A1 | 1/2007 | Kardach et al. | |
| 2007/0094436 A1 | 4/2007 | Keown et al. | |
| 2007/0180281 A1 | 8/2007 | Partovi et al. | |
| 2007/0300088 A1 | 12/2007 | Lippojoki | |
| 2008/0062927 A1 | 3/2008 | Zhu et al. | |
| 2008/0074992 A1* | 3/2008 | Sams et al. | 370/216 |
| 2008/0162855 A1 | 7/2008 | Thomas | |
| 2008/0307244 A1 | 12/2008 | Bertelsen et al. | |
| 2009/0164684 A1 | 6/2009 | Atherton et al. | |
| 2009/0210595 A1 | 8/2009 | Chaussade | |
| 2009/0259713 A1* | 10/2009 | Blumrich et al. | 709/201 |
| 2010/0083026 A1* | 4/2010 | Millet et al. | 713/601 |
| 2010/0153759 A1 | 6/2010 | Singhal | |
| 2010/0162019 A1* | 6/2010 | Kumar et al. | 713/323 |
| 2010/0257393 A1 | 10/2010 | Zhuang et al. | |
| 2010/0281195 A1 | 11/2010 | Daniel et al. | |
| 2011/0293035 A1* | 12/2011 | Kobayashi | 375/295 |
| 2011/0296222 A1* | 12/2011 | Tan et al. | 713/324 |
| 2012/0079159 A1* | 3/2012 | Rajwar et al. | 710/309 |

FOREIGN PATENT DOCUMENTS

| | | | |
|---|---|---|---|
| JP | 2007-517332 A | 6/2007 | |
| JP | 2007-249808 A | 9/2007 | |
| JP | 2008-194563 A | 8/2008 | |
| JP | 2009-217813 A | 9/2009 | |
| JP | 2010-500807 A | 1/2010 | |
| JP | 2010-515164 A | 5/2010 | |
| TW | 546560 B | 8/2003 | |
| WO | 89/04516 A1 | 5/1989 | |
| WO | 2008/018017 A2 | 2/2008 | |
| WO | 2011/153042 A2 | 12/2011 | |
| WO | 2011/153042 A3 | 4/2012 | |
| WO | 2012/047600 A2 | 4/2012 | |
| WO | 2012/088530 A2 | 6/2012 | |
| WO | 2012/047600 A3 | 8/2012 | |
| WO | 2012/088530 A3 | 12/2012 | |

OTHER PUBLICATIONS

Berktold et al., "CPU Monitoring With DTS/PECI", Intel Corporation, White Paper, Sep. 2009, pp. 1-23.

International Search Report and Written Opinion Received for the PCT Application No. PCT/US2011/053335, mailed on Jun. 22, 2012, 9 pages.

International Search Report and Written Opinion Received for the PCT Application No. PCT/US2011/067260, mailed on Aug. 14, 2012, 9 pages.

International Preliminary Report on Patentability Received for the PCT Application No. PCT/US2011/037990, mailed on Dec. 13, 2012, 5 pages.

International Preliminary report on Patentability and Written Opinion received for PCT Application No. PCT/US2011/053335, mailed on Apr. 4, 2013, 6 pages.

Office Action received for Chinese Patent Application No. 201110158611.5, mailed on Jun. 7, 2013, 5 pages of English Translation and 6 pages of Office Action.

Office Action received for U.S. Appl. No. 13/040,507, mailed on Apr. 8, 2013, 19 pages.

Office Action received for U.S. Appl. No. 12/978,452, mailed on Sep. 20, 2013, 9 pages.

"FIFO: First-In First-Out", FOLDOC: Free On-Line Dictionary of Computing, Dec. 6, 1999, retrieved on Nov. 22, 2013, 1 page. available online at <http://foldoc.org/fifo>.

Office Action received for U.S. Appl. No. 13/040,507, mailed on Oct. 9, 2013, 37 pages.

Extended European Search Report received for European Patent Application No. 11790212.2, mailed on Jan. 8, 2014, 6 pages.

Supplementary Search Report received for European Patent Application No. 11790212.2, mailed on Jan. 24, 2014, 1 page.

Office action received for Japanese Patent Application No. 2013-513224, mailed on Dec. 10, 2013, 3 pages of English Translation and 3 pages of Japanese Office Action.

"Data link layer", extracted from The Free Online Dictionary of Computing, last update on Feb. 14, 1995, Retrieved on Apr. 4, 2014, Webpage available at: <http://foldoc.org/data+link-Flayer+22 .

Office Action Received for Taiwanese Patent Application No. 100134377 mailed on Nov. 13, 2013, 8 pages of Office Action and 9 pages of English Translation.

Notice of Allowance Received for U.S. Appl. No. 12/978,452 mailed on Mar. 18, 2014, 5 pages.

Office Action Received for U.S Appl. No. 13/040,507 mailed on Apr. 9, 2014, 32 pages.

Office Action Received for the Chinese Application No. 201110158611.5 mailed on Feb. 8, 2014, 6 pages of Office Action and 5 pages of English Translation.

International Preliminary Report and Written Opinion Received for the PCT Application No. PCT/US2011/067260 mailed on Jul. 4, 2013, 6 pages.

* cited by examiner

INTEGRATION OF PROCESSOR AND INPUT/OUTPUT HUB

FIELD

The present disclosure generally relates to the field of electronics. More particularly, an embodiment of the invention relates to techniques for integration of a processor and an Input/Output (I/O) hub.

BACKGROUND

In some current implementations, a processor may communicate with input/output (I/O) devices via an I/O Hub (IOH). Furthermore, the processor may be provided on a different integrated circuit (IC) device than the IOH. A bus may be used to communicate between these IC devices.

Such implementations may, however, reduce speed, e.g., due to delay associated with communicating signals between the IC devices, and/or increase power consumption, e.g., due to presence of additional circuitry required to allow for communication between the IC devices. Also, additional (board) space may be required for the discrete IOH component(s).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments relate to techniques to reduce delay, reduce power consumption, reduce die size, and/or reduce complexity associated with power management in a computing device. In addition, some embodiments allow for more control and/or communication bandwidth between the two integrated components, e.g., to further refine power state manipulation/control.

In an embodiment, an IOH may be integrated on the same IC device as a processor (which may include one or more processor cores as discussed herein in more detail below). This allows for removal of logic that is only needed for off-chip communication. For example, logic associated with transmission of signals off chip across an interconnect (e.g., physical link) may be removed. Also, logic that would normally control transmitting, training, testing, power state management, etc. of the physical link may be removed.

Even though the physical link and additional logic is removed, the same communication mechanisms may be maintained in some embodiments, e.g., to allow for compatibility with other existing logic, communication protocols, design requirements, etc. For instance, in a QPI (Quick Path Interconnect) based processor, the QPI physical layer and lower link layer may be removed. For the accompanying IOH, the physical layer may be.

In some embodiments, one or more of the following may be utilized to provide the integrated IOH (IIO) and processor:

1. a wider and/or slower bus/interconnect to couple the processor components and IIO, e.g., to eliminate high speed circuit and power challenges (when compared with the bus/interconnect that couples the non-integrated processor and IOH, for example);

2. one or more First-In, First-Out (FIFO) devices to enable deterministic data transfer between the processor and Integrated IIO;

3. one or more side band signals to signal powering up and down of the link(s) between the processor and IIO;

4. protocol to enable either side to initiate shutting down or waking up of the computing system that includes the processor;

5. optional side band signals to further control granularity/depth of low power states; and/or 6. additional signal(s) to take advantage of common mechanisms (e.g., for more space/power reductions).

One or more of the above-mentioned elements may be provided in various computing environments. More particularly, FIG. 1 illustrates a block diagram of portions of a computing system 100, according to an embodiment.

The system 100 may include a Central Processing Unit (CPU) 101 (or more generally a processor) which includes a processor portion 102. CPU 101 components may be on a single IC die. The CPU 101 may include one or more processors (or processor cores) as discussed herein, e.g., with reference to FIG. 5. The processor 102 may include various components, such as private or shared cache(s), execution unit(s), one or more memory/graphics control modules, etc. (not shown). Moreover, the CPU 101 may communicate through a bus 104 with other components such as a system memory 106. The memory 106 may store data at the direction of the CPU 101, e.g., communicated with one or more I/O devices 107. The device(s) 107 may be a peripheral device that communicates in accordance with the Peripheral Component Interconnect (PCI) (and its variations such as PCI express (PCIe) specification, Revision 2.0, 2006) (and/or other proprietary or non-proprietary I/O interconnect(s) such as Direct Memory Interface (DMI)) in some embodiments. As will be further discussed below, the CPU 101 may include an IIO 120 that provides support for communicating with the device(s) 107 in accordance with the aforementioned PCIe specification and/or DMI.

Figure 1:
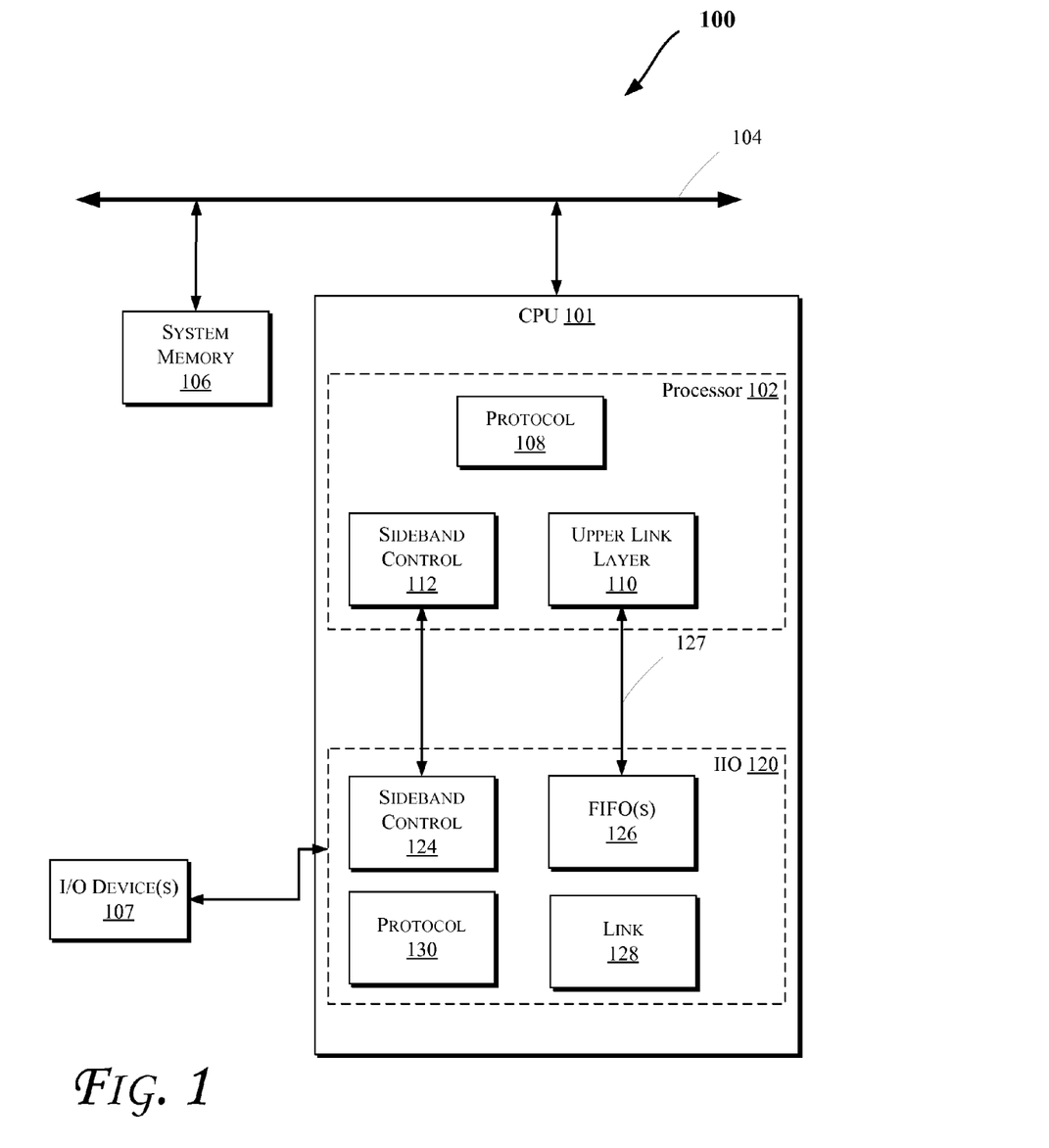
FIGS. 1 and 4-5 illustrate block diagrams of embodiments of computing systems, which may be utilized to implement various embodiments discussed herein.

As illustrated in FIG. 1, the processor 102 may include a protocol logic 108 (e.g., to provide the support for shutting down or waking system 100), an upper link layer logic 110 (e.g., to provide link support for upper link layer communication with the IIO 120), and a sideband control logic 112 (e.g., to provide sideband communication support in lieu of removal of the QPI physical layer and lower link layer, as discussed above). In an embodiment, the upper link layer logic may include one or more of: virtual channel queue(s), flow control and/or credits logic, CRC (Cyclical Redundancy Check) check and/or generation logic, parameter exchange logic, etc. Furthermore, the removed lower link layers, in accordance with some embodiments, may include Phit/Flit assembly/deassembly/swizzling, physical layer control registers, link power (e.g., L0s) and width modes, link initialization/training, etc.

The IIO 120 may include a sideband control logic 124 (e.g., to communicate sideband signals with the logic 112), one or more FIFOs 126 (e.g., to enable deterministic data transfer between the upper link layer 110 and IIO 120 via an interconnect/bus 127), a link logic 128 (e.g., to provide link support for communication between the processor 102 and the IIO 120), and a protocol logic 130 (e.g., to provide the support for shutting down or waking system 100).

In an embodiment, a relatively wider and/or slower bus/interconnect 127 may eliminate high speed circuit and power challenges (when compared with the bus/interconnect that couples the non-integrated processor and IOH, for example). In one embodiment, the bus 127 is widened four times, allowing the frequency to be reduced by four times. A valid bit may be added to allow for more flexibility (null flits are now optional, etc.) and/or to support tester modes.

In some embodiments, FIFOs 126 going in both directions (to and from IIO 120) are added. When transferring data between the processor 102 components (e.g., logic 110) and IIO 120, the data is written into a FIFO based on a write pointer and is read by the receiver based on a read pointer. The separation of the write and read pointers may be programmable, for example, to account for clock skew differences between the processor 102 components (e.g., logic 110) and IIO 120. This allows the processor 102 and IIO 120 to run off of different Phase-Locked Loops (PLLs) for flexibility, finer granularity of power states, etc.

In an embodiment, the following sideband signals are used (e.g., via logics 112 and 124):
1. From the IIO 120:
    A. IIO_wake—IIO 120 requests to wake system 100 that is in low power mode; and
    B. IIO_is awake—IIO 120 is awake and may function (for instance, power is ramped, PLL's locked, etc.); and
2. From the processor 102:
    A. processor_wake (e.g., WAKEUP_IIO_PLL)—processor 102 request to wake system 100 that is in low power mode; and
    B. processor_is_awake (e.g., BGFRun)—processor 102 is awake. In some embodiments, this signal may also indicate both the processor 102 and IIO 120 are awake. In turn, the processor 102 may determine when the whole CPU 101 chip is up and ready to run based on the IIO_is_awake signal. This signal may reset the FIFO pointers and allows the FIFO(s) 126 it to transfer data.

Figure 2:
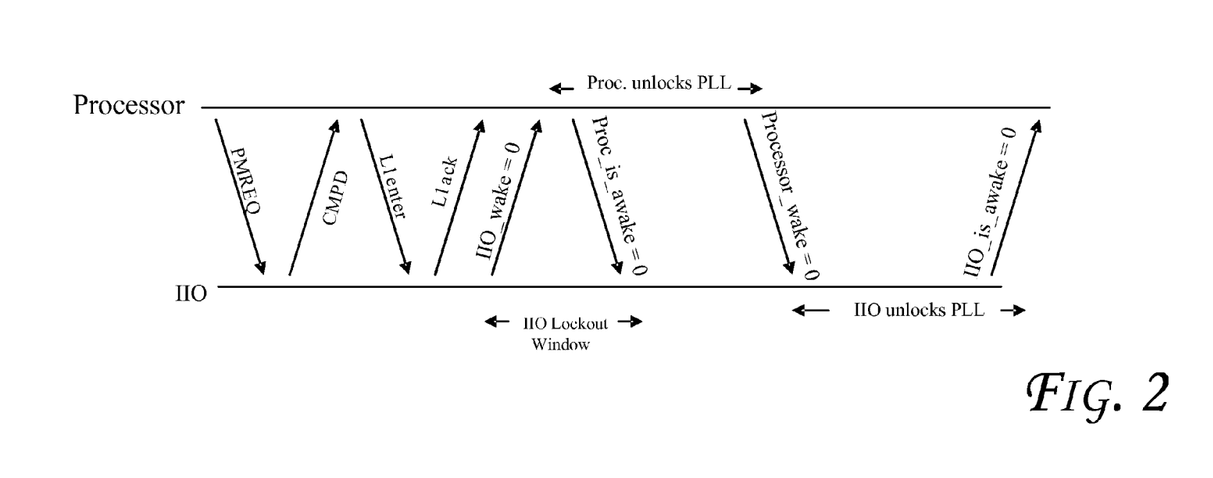
FIGS. 2-3 and 6-7 illustrate signals or messages exchanged between portions of a processor, according to some embodiments.
Figure 3:
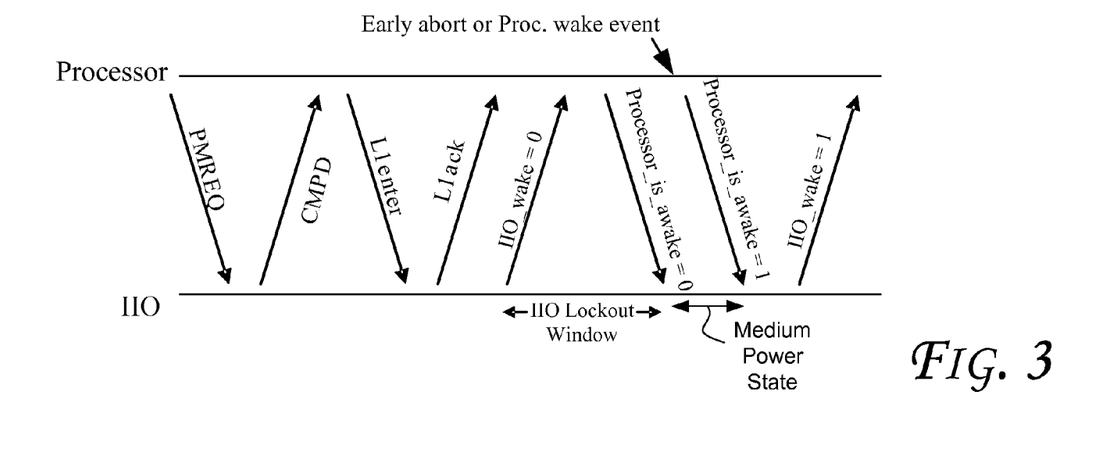

FIGS. 2-3 illustrate signals/messages exchanged between the processor 102 and IIO 120, according to some embodiments. FIG. 2 illustrates entry into a low power state (e.g., C6/C7). FIG. 3 illustrates entry into a medium low power state (e.g., C3) that is not as low as the case shown in FIG. 2 (e.g., with a faster wake time, for example). Moreover, even though FIGS. 2-3 illustrate an example with "0" indicating "not" and "1" indicating "yes", various embodiments may be implemented by using other types of symbols, reverse 0/1, etc.

As shown in FIG. 2, one or more handshakes (e.g., in accordance with QPI) are performed including a Power Management Request (PMREQ) transmitted from the processor 102; the IIO 120 responds with an Completed (CMPD) signal; the processor 102 requests entry into L1 state; and the IIO 120 acknowledges the L1 request. After the handshakes, sideband signals are transmitted as shown. As shown, the processor may unlock its PLL(s) between processor_is_awake and processor_wake. Also, IIO may have a lock out window between IIO_wake and processor_is_awake (e.g., to not initiate a wake to prevent unwanted corner cases). Further, between processor_wake and IIO_is_awake, the IIO unlocks its PLL(s).

Similar handshakes may be performed in the exchange of FIG. 3. The processor_wake and IIO_is_awake signal are not transmitted when compared with the case in FIG. 2. To wake from the medium low power state, the protocol supports either processor transmitting processor_is_awake or the IIO asserting IIO_wake to initiate the wake in an embodiment. The same mechanism may handle early wake events that occur before the processor/IIO have fully powered down. For example, FIG. 3 shows an example where the processor initiates the wake before the processor/IIO has gone into the deepest power state.

Furthermore, the IIO or processor may initiate a wake from low power state (e.g., without QPI messages). This was previously done over QPI with analog levels and level detectors. In an embodiment, IIO initiates a wake by asserting IIO_wake. Processor may initiate a wake by asserting processor_wake. Once the wake signal is transmitted, the remaining signals may be sent in a specific order to complete the wake.

For example, for an IIO initiated wake, the following sequence occurs (which assumes that signals are normally high—but of course the reverse implementation is also contemplated in some embodiments):

| | |
|---|---|
| IIO_wake | 0->1 |
| processor_wake | 0->1 |
| IIO_is_awake | 0->1 (*) |
| processor_is_awake | 0->1 |

The protocol (marked with *) also supports the IIO already being awake during the low power state (another medium low power state). In that case, IIO_is_awake may already have been asserted by this point.

In some embodiments, optional sideband signals are used for more granularity/control power modes between the IIO and processor such as one or more of the following:
1. From the processor:
    A. ForcePwrRamp (PCUtoIIOForceRmp)—processor requests IIO to turn on or off its power. This may be useful for modes where processor is to wake but knows the IIO will not be fully woken. Rather than go through the full protocol, only the power needs to be turned on to enable using repeaters, etc. in the IIO for processor purposes.
2. From the IIO:
    A. PwrGood (IIOtoPCUPwrGd)—IIO indicates power is sufficient within the IIO and the processor ForcePwrRamp is asserted.

In various embodiments, additional signals may also be used to take advantage of common mechanisms (more space/power reductions). For instance, common infrastructure features present on chips may be combined for additional reduction such as:

(1) Fuses—Separate fuse blocks with a number of common fuses are not needed anymore. A single fuse block, e.g., with additional fuse(s) added for unique IIO fused options may be used. The interface may be a serial download fuse bus to the IIO, e.g., which may be identical to the fuse bus that is coupled to the rest of the processor blocks.

(2) Frequency selection—Non-integrated components generally require separate mechanisms to select the frequency of key interfaces. This selection mechanism requires power cycle reset and careful coordination between the two components. With the integrated IIO and processor, one frequency selection logic may be removed and both the IIO and processor frequency selected off of a single frequency selection logic. This may be done with sideband signals that reflect the clock ratio.

In an embodiment, the IIO resets the processor the same way that the IOH reset the discrete processor. Further, the circuits to drive the pin may be removed for power/space reduction.

Figure 4:
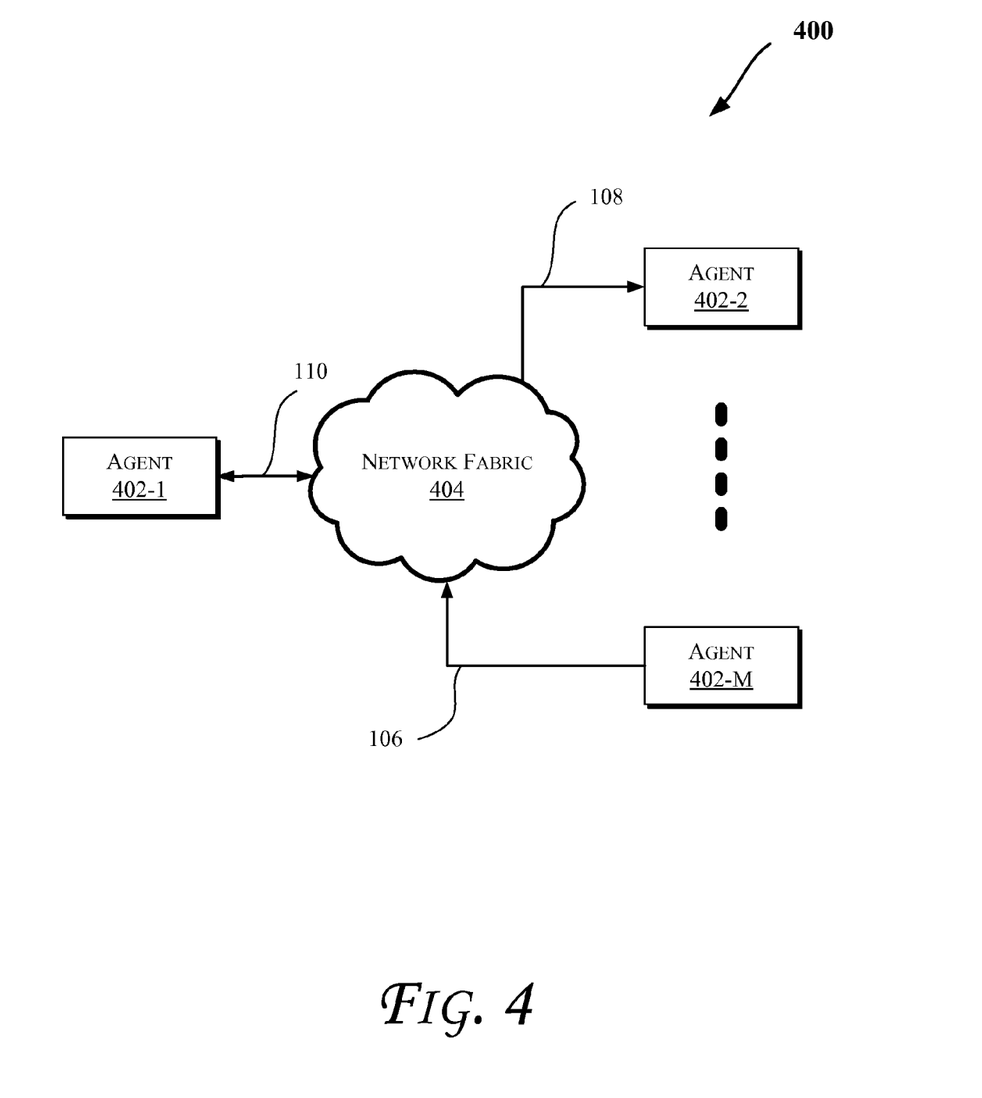

FIG. 4 illustrates a block diagram of a computing system 400, according to an embodiment of the invention. The system 400 may include one or more agents 402-1 through 402-M (collectively referred to herein as "agents 402" or more generally "agent 402"). In an embodiment, one or more of the agents 402 may be any of components of a computing system, such as the computing systems discussed with reference to FIG. 1 or 5.

As illustrated in FIG. 4, the agents 402 may communicate via a network fabric 404. In one embodiment, the network fabric 404 may include a computer network that allows various agents (such as computing devices) to communicate data. In an embodiment, the network fabric 404 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 400 may support a layered protocol scheme, which may include a physical layer, a link layer, a routing layer, a transport layer, and/or a protocol layer. The fabric 404 may further facilitate transmission of data (e.g., in form of packets) from one protocol (e.g., caching processor or caching aware memory controller) to another protocol for a point-to-point or shared network. Also, in some embodiments, the network fabric 404 may provide communication that adheres to one or more cache coherent protocols.

Furthermore, as shown by the direction of arrows in FIG. 4, the agents 402 may transmit and/or receive data via the network fabric 404. Hence, some agents may utilize a unidirectional link while others may utilize a bidirectional link for communication. For instance, one or more agents (such as agent 402-M) may transmit data (e.g., via a unidirectional link 406), other agent(s) (such as agent 402-2) may receive data (e.g., via a unidirectional link 408), while some agent(s) (such as agent 402-1) may both transmit and receive data (e.g., via a bidirectional link 410).

Figure 5:
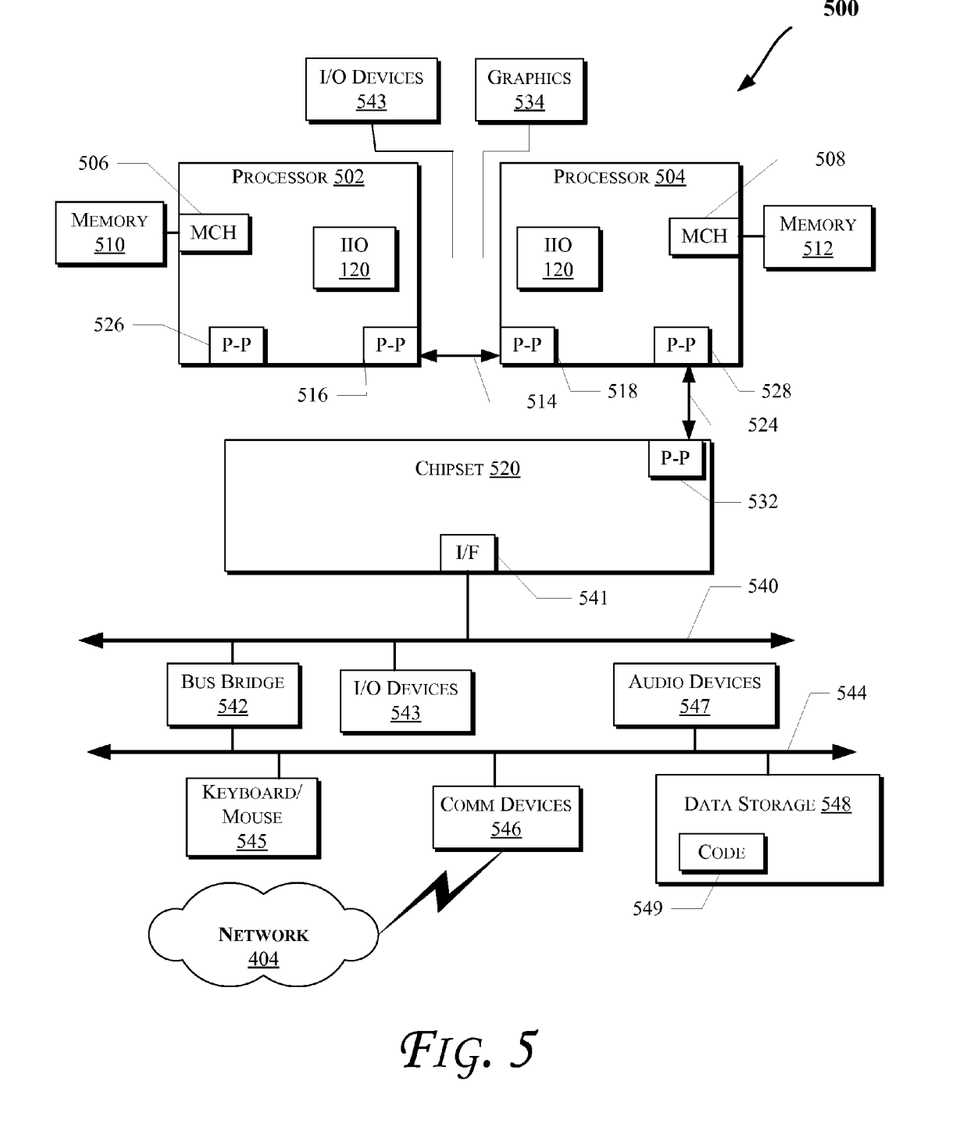

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 106 of FIG. 1. As shown in FIG. 5, the processors 502 and 504 may also include IIO logic 120 such as those discussed with reference to FIGS. 1-4. Moreover, even though an IIO logic 120 is illustrated for each processor in FIG. 5, some embodiments may utilize a single IIO logic 120. Also, even though FIG. 5 illustrates each IIO logic 120 coupled to one I/O device or I/O device type, each IIO logic 120 may be coupled to more than one or more than one type of I/O devices.

In an embodiment, the processors 502 and 504 may be one of the processors 502 discussed with reference to FIG. 5. The processors 502 and 504 may exchange data via a point-to-point (PtP) interface 514 using PtP interface circuits 516 and 518, respectively. Also, one or more of the processors 502 and 504 may exchange data with a chipset 520 via individual PtP interfaces (e.g., interface 524) using point-to-point interface circuits 526, 528, and 532. In the embodiment shown in FIG. 5, only one processor (processor 504) may communicate with the chipset 520. Through the IIO logic 120, a processor (e.g., processor 504) may exchange data with a high-performance graphics circuit 534.

In at least one embodiment, the I/O functionality may be integrated into the processors 502/504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 (e.g., using an interface circuit 541). The bus 540 may have one or more devices that communicate with it, such as a bus bridge 542 and I/O devices 543 (which may communicate with the IIO via other components such as shown in FIG. 5 or directly as shown in FIG. 1, for example). Via a bus 544, the bus bridge 542 may communicate with other devices such as a keyboard/mouse 545, communication devices 546 (such as modems, network interface devices, or other communication devices that may communicate with the computer network 405), audio I/O device, and/or a data storage device 548. The data storage device 548 may store code 549 that may be executed by the processors 502 and/or 504.

Figure 6:
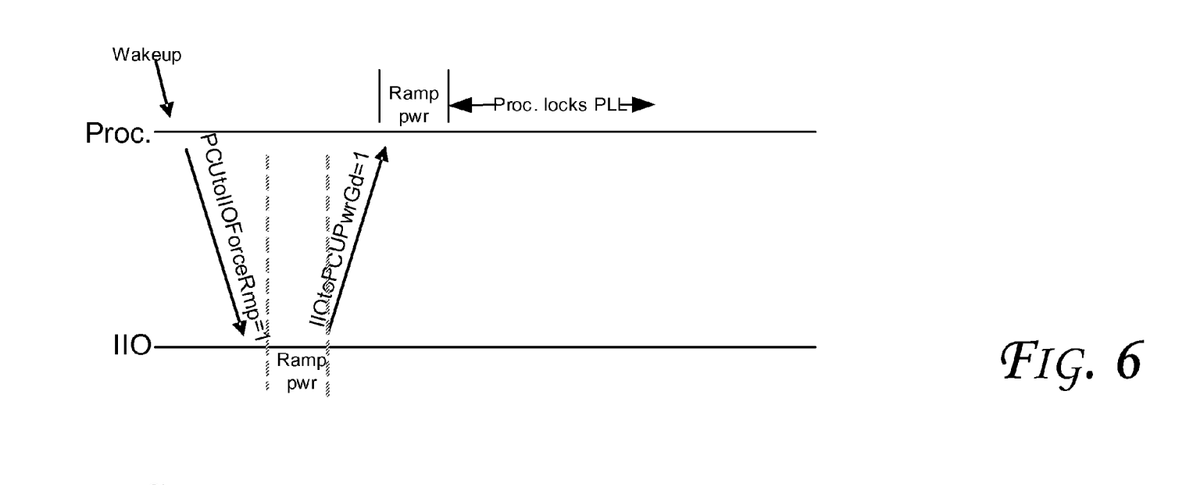
Figure 7:
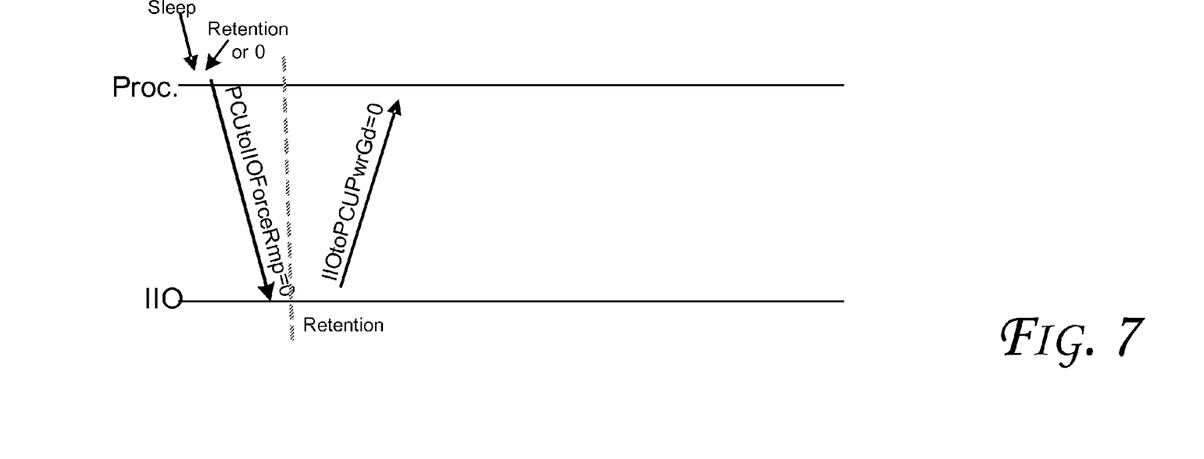

FIGS. 6-7 illustrate signals/messages exchanged between a processor and IIO logic, according to some embodiments. FIG. 6 illustrates processor initiated wake to accommodate a PECI (Platform Environmental Control Interface, e.g., for processor thermal management) based wake event/request which ramps the power for IIO logic without fully waking the IIO logic (e.g., while power is applied to the IIO, the clocks/PLLs remain off). Generally, PECI refers to a sideband interface to a processor which is used to manage a processor's thermal controls/operations. It reflects one mechanism that allows waking of a processor. It provides a wake event that does not involve I/O, so it does necessitate the use of the IIO. FIG. 7 illustrates a processor initiated sleep after a wake due to PECI request such as shown in FIG. 6. Moreover, even though FIGS. 6-7 illustrate an example with "0" indicating "not" and "1" indicating "yes", various embodiments may be implemented by using other types of symbols, reverse 0/1, etc.

Referring to FIG. 6:
1. IIO PLL may or may not be running;
2. Processor sends ForcePwrRamp (PCUtoIIOForceRmp)=1 signal to IIO logic (in response to a PECI request);
3. If needed, IIO logic ramps power and asserts PwrGood (IIOtoPCUPwrGd)=1 once the power is ramped;
4. Processor completes wake sequence so processor can service PECI request.

Referring to FIG. 7:
1. IIO PLL is running due to the wake discussed with reference to FIG. 6;

2. Processor sends ForcePwrRamp (PCUtoIIOForceRmp)=0 signal to IIO logic (to exit wake initiated in response to a PECI request);
3. IIO logic enters a retention power state to maintain correct data and asserts PwrGood (IIOtoPCUPwrGd)=0 once the power is in retention state.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable storage medium having stored thereon instructions (or software procedures) used to program a computer to perform a process discussed herein.

The storage medium may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions). Volatile memory may include devices such as random access memory (RAM), dynamic RAM (DRAM), synchronous DRAM (SDRAM), static RAM (SRAM), etc.

Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided in a propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An integrated circuit device comprising:
a processor; and
an Integrated Input/Output (IIO) logic, at least a portion of which is in hardware, wherein the IIO logic is to provide support for communication between the processor and one or more input/output devices,
wherein a side band signal, to be generated by the IIO logic, is to cause a change in a power management state of the processor and wherein the processor is to comprise sideband control logic to generate a signal to cause a change in a power management state of the IIO logic.

2. The device of claim 1, wherein the IIO logic is to comprise sideband control logic to generate a signal to indicate the IIO is awake.

3. The device of claim 1, wherein the processor is to comprise sideband control logic to generate a signal to indicate that the processor is awake.

4. An integrated circuit device comprising:
a processor; and
an Integrated Input/Output (IIO) logic, at least a portion of which is in hardware, wherein the IIO logic is to provide support for communication between the processor and one or more input/output devices,
wherein a side band signal, to be generated by the IIO logic, is to cause a change in a power management state of the processor and wherein the processor is to request the IIO logic to turn on or to turn off.

5. The device of claim 4, wherein the IIO logic is to generate a signal to indicate power is sufficient within the IIO logic and that the request is asserted.

6. The device of claim 1, further comprising a first First-In, First-Out (FIFO) device to store data transmitted from the processor to the IIO logic and a second FIFO to store data transmitted to the processor from the IIO logic.

7. The device of claim 1, further comprising one or more fuses to indicate one or more options associated with the IIO logic.

8. The device of claim 1, further comprising single frequency selection logic to cause frequency selection for at least one the processor or the IIO logic.

9. The device of claim 1, wherein the processor is to comprise one or more processor cores.

10. An integrated circuit device comprising:
a processor; and
an Integrated Input/Output (IIO) logic, at least a portion of which is in hardware, wherein the IIO logic is to provide support for communication between the processor and one or more input/output devices,
wherein a side band signal, to be generated by the processor, is to cause a change in a power management state of the IIO logic and wherein the processor is to comprise a sideband control logic to generate a signal, in response to a Platform Environmental Control Interface (PECI) request, to cause power ramp up in the IIO logic.

11. The device of claim 10, wherein the processor is to comprise sideband control logic to generate the side band signal.

12. The device of claim 10, wherein the IIO logic is to comprise a sideband control logic to generate a signal to indicate the IIO is awake.

13. The device of claim 10, wherein the IIO logic is to comprise a sideband control logic to generate a signal to cause a change in a power management state the processor.

14. The device of claim 10, wherein the IIO logic is to communicate data between a system memory and one or more I/O devices.

15. A method comprising:
generating a first signal, at a first hardware circuitry, to cause a change in a power management state of a processor or an IIO logic, wherein the processor and the IIO logic are on a same integrated circuit die wherein the IIO logic is to provide support for communication between the processor and one or more input/output devices;

generating a second signal, at a second hardware circuitry, in response to the first signal, to indicate that one of the processor or the IIO logic is awake; and causing, by a single frequency selection logic, frequency selection for the processor and the IIO logic.

16. The method of claim 15, further comprising communicating data between a system memory and one or more I/O devices via the IIO logic.

17. The method of claim 15, further comprising storing data transmitted from the processor to the IIO logic in a first FIFO and data transmitted to the processor from the IIO logic in a second FIFO.

18. The device of claim 1, wherein the processor is to request the IIO logic to turn on or to turn off.

19. The device of claim 4, wherein the IIO logic is to comprise sideband control logic to generate a signal to indicate the IIO is awake.

20. The device of claim 4, wherein the processor is to comprise sideband control logic to generate a signal to indicate that the processor is awake.

* * * * *

UNITED STATES PATENT AND TRADEMARK OFFICE
CERTIFICATE OF CORRECTION

PATENT NO. : 8,850,250 B2  
APPLICATION NO. : 12/791836  
DATED : September 30, 2014  
INVENTOR(S) : Lily Pao Looi et al.

Page 1 of 1

It is certified that error appears in the above-identified patent and that said Letters Patent is hereby corrected as shown below:

On title page 2, in column 2, References Cited under "Other Publications", line 36, delete "-Flayer+22" and insert -- +layer> --, therefor.

In the Claims

In column 8, line 34, in claim 8, after "one" insert -- of --.

Signed and Sealed this
Thirty-first Day of March, 2015

Michelle K. Lee
*Director of the United States Patent and Trademark Office*